A. WORDEN.
Stove Pipe.
No. 13,113.
Patented June 19, 1855.
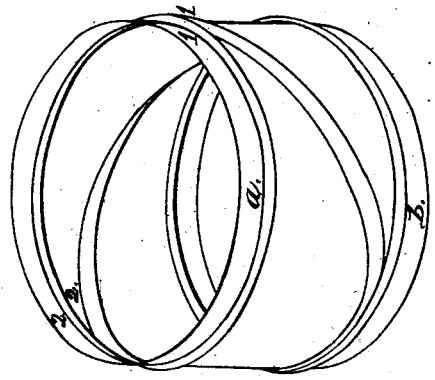
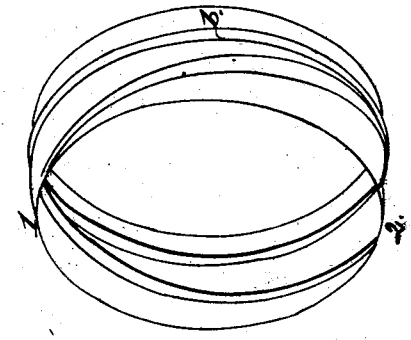
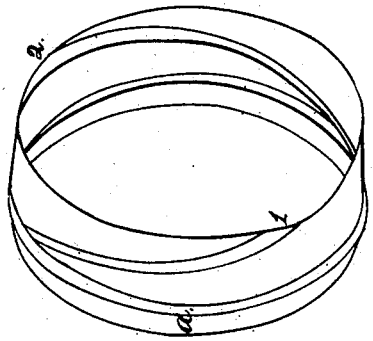

UNITED STATES PATENT OFFICE.

ALVA WORDEN, OF YPSILANTI, MICHIGAN.

JOINT FOR STOVEPIPES.

Specification of Letters Patent No. 13,113, dated June 19, 1855.

*To all whom it may concern:*

Be it known that I, ALVA WORDEN, of Ypsilanti, county of Washtenaw, and State of Michigan, have invented an improvement upon the mode heretofore patented for connecting joints of stovepipes by means of a screw cut or swaged upon connecting-pieces or upon the ends of joints of stovepipes; and I do hereby declare that the following is a full and exact description of the said invention.

The nature of my improvement consists in attaching to the ends of joints of stovepipes a half circle tapering tubular screw cut or swaged on separate connecting pieces or on the ends of the joints of pipe, the same being double and tapering the connecting ends enter loosely and by a half turn of the pipe the joint is tightly closed and remains firmly joined. And at the same time the screw connecting by means of a half circle and being of a tapering form it is readily loosened and disconnected by a slight turn backward and the pipe easily taken down separated and not liable to rust together.

This improved connecting thread or screw cut or swaged is demonstrated by letter "A" in the drawings accompanying these specifications. The connecting ends of the joints enter or connect with a half circle tapering screw as demonstrated by Figures 1 and 2 in the drawings. The end or thread "A" upon the other joint, which being connected enter easily and loosely as the thread or screw is tapering and by a half turn of the pipe are drawn up firmly and tightly two inches, and remain firmly connected.

I am aware that a swaged screw or spiral groove for connecting joints of stove pipe has been patented to James N. Warner. But my invention is an improvement on said patent as with my means of connecting the joints of stove pipe they are firmly secured together by a half revolution of the pipe. The tapering inclined semi-circular grooves enter easily and when turned backward a slight movement loosens the joint and thus the difficulty of separating the threads when rust has accumulated upon them is avoided.

Having thus fully described my invention what I claim and desire to secure by Letters Patent is—

The "inclined tapering semicircular grooves," constructed in the manner and for the purpose specified all of which are fully demonstrated by the specifications with drawings herewith transmitted.

ALVA WORDEN.

Witnesses:
A. C. BLODGET,
STEPHEN FULLER.